United States Patent
Sakai et al.

(10) Patent No.: US 11,804,614 B2
(45) Date of Patent: Oct. 31, 2023

(54) POWER SUPPLY SYSTEM, POWER SUPPLY METHOD AND NON-TRANSITORY COMPUTER READABLE MEDIUM

(71) Applicant: Honda Motor Co., Ltd., Tokyo (JP)

(72) Inventors: Ryoji Sakai, Saitama (JP); Takuto Nakagawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 127 days.

(21) Appl. No.: 17/469,911

(22) Filed: Sep. 9, 2021

(65) Prior Publication Data

US 2022/0123337 A1    Apr. 21, 2022

(30) Foreign Application Priority Data

Oct. 20, 2020  (JP) ................. 2020-176117

(51) Int. Cl.
*H01M 8/04*    (2016.01)
*H01M 8/04858*    (2016.01)

(52) U.S. Cl.
CPC .... *H01M 8/04947* (2013.01); *H01M 2250/20* (2013.01)

(58) Field of Classification Search
CPC ........ H01M 8/04947; H01M 2250/20
USPC ........................................... 429/430
See application file for complete search history.

(56) References Cited

U.S. PATENT DOCUMENTS

| | | | |
|---|---|---|---|
| 2016/0064754 A1* | 3/2016 | Hoshi | H01M 8/04559 429/429 |
| 2017/0232851 A1* | 8/2017 | Unno | H02P 27/08 307/10.1 |
| 2017/0250427 A1* | 8/2017 | Sakai | H01M 8/04201 |
| 2017/0263961 A1* | 9/2017 | Kazuno | H01M 8/04604 |
| 2017/0274902 A1* | 9/2017 | Kumada | B60L 50/64 |
| 2019/0255969 A1* | 8/2019 | Takamoto | H01M 8/04089 |

FOREIGN PATENT DOCUMENTS

JP    2007265686    10/2007

* cited by examiner

*Primary Examiner* — James M Erwin
(74) *Attorney, Agent, or Firm* — JCIPRNET (57) ABSTRACT

The power supply system includes: a fuel cell, capable of generating power; a power storage device, storing power generated by the fuel cell; and a control device, controlling at least the fuel cell. The control device, under a tendency that power consumption of a load at least connected with the fuel cell and the power storage device decreases, determines a first lower limit power based on power generated by the fuel cell before a predetermined time, causes the fuel cell to generate second power equal to or greater than the first lower limit power when first power generated by the fuel cell determined based on a power supplied to the load drops below the first lower limit power, and determines the first lower limit power with a tendency that the greater the generated power, the greater a difference between the generated power and the first lower limit power is increased.

12 Claims, 10 Drawing Sheets

POWER SUPPLY SYSTEM, POWER SUPPLY METHOD AND NON-TRANSITORY COMPUTER READABLE MEDIUM

CROSS-REFERENCE TO RELATED APPLICATION

This application claims the priority benefit of Japan application serial no. 2020-176117, filed on Oct. 20, 2020. The entirety of the above-mentioned patent application is hereby incorporated by reference herein and made a part of this specification.

BACKGROUND

Technical Field

The disclosure relates to a power supply system, a power supply method, and a non-transitory computer readable medium.

Description of Related Art

The conventional art has disclosed a fuel cell system which controls power generation of a fuel cell by setting a dynamic required output as the required output in the case where a discrepancy between a static required output in accordance with a current load state and a maximum dynamic required output among the dynamic required outputs equal to or lower than an upper limit value having a delay element in the static required output is greater than a predetermined value, and setting the dynamic required output as the required output in the case where the discrepancy is equal to or lower than the predetermined value (e.g., Patent Document 1). The fuel cell system reliably removes a vibration component, which is a noise component included in the static required output, and generates the required output realizing a favorable power generation control process without stunting the transient performance.

PRIOR ART DOCUMENT

Patent Document

[Patent Document 1] Japanese Laid-open No. 2007-265686

However, the technique above focuses on removing the vibration component and suppressing the stunting of the transient performance, but does not take the deterioration of the fuel cell into consideration.

SUMMARY

A power supply system, a power supply method, and a non-transitory computer readable medium storing a program according to an embodiment of the disclosure adopt configurations as follows.

A power supply system according to an aspect of the disclosure includes a fuel cell capable of generating power; a power storage device, storing power generated by the fuel cell; and a control device, controlling at least the fuel cell. The control device is configured to: the control device is configured to: in a case with a tendency that power consumption of a load at least connected with the fuel cell and the power storage device decreases, determine a first lower limit power based on generated power generated by the fuel cell before a predetermined time; cause the fuel cell to generate a second power equal to or greater than the first lower limit power in a case where a first power generated by the fuel cell, which is determined based on a power supplied to the load, drops below the first lower limit power; and determine the first lower limit power with a tendency that the greater the generated power, the greater a difference between the generated power and the first lower limit power is increased.

According to an embodiment of the disclosure, the control device is configured to: in a case where the first power drops below the first lower limit power and the first lower limit power exceeds a limit value set based on a power which the power storage device is able to store, cause the fuel cell to generate a third power, in place of the second power, based on the limit value.

According to an embodiment of the disclosure, the control device is configured to: determine the first lower limit power in accordance with the generated power by using information in which the generated power is associated with the first lower limit power.

According to an embodiment of the disclosure, the control device is configured to: determine the first lower limit power with a tendency that the lower a temperature of the fuel cell or near the fuel cell, the greater the difference between the generated power and the first lower limit power is increased with respect to an increase of the generated power.

According to an embodiment of the disclosure, the control device is configured to: determine the first lower limit power with a tendency that the lower a humidity of the fuel cell or near the fuel cell, the greater the difference between the generated power and the first lower limit power is increased with respect to an increase of the generated power.

A power supply method according to another aspect of the disclosure includes: by a control device which at least controls a fuel cell capable of generating power, in a case with a tendency that power consumption of a load at least connected with the fuel cell and a power storage device storing power generated by the fuel cell decreases, determining a first lower limit power based on generated power generated by the fuel cell before a predetermined time, causing the fuel cell to generate a second power equal to or greater than the first lower limit power in a case where a first power generated by the fuel cell, which is determined based on a power supplied to the load, drops below the first lower limit power, and determines the first lower limit power with a tendency that the greater the generated power, the greater a difference between the generated power and the first lower limit power is increased.

A non-transitory computer readable medium according to yet another aspect of the disclosure stores a program. The program causes a control device which controls at least a fuel cell capable of generating power, in a case with a tendency that power consumption of a load at least connected with the fuel cell and a power storage device storing power generated by the fuel cell decreases, to perform: a process of determining a first lower limit power based on generated power generated by the fuel cell before a predetermined time; in a case where a first power generated by the fuel cell, which is determined based on a power supplied to the load, drops below the first lower limit power, causing the fuel cell to generate a second power equal to or greater than the first lower limit power; and a process of determining the first lower limit power with a tendency that the greater the generated power, the greater a difference between the generated power and the first lower limit power is increased.

DESCRIPTION OF THE EMBODIMENTS

According to one or some exemplary embodiments of the disclosure, it is to provide a power supply system, a power supply method, and a non-transitory computer readable medium storing a program capable of suppressing the deterioration of the fuel cell.

According to one or some exemplary embodiments of the disclosure, the control device determines the first lower limit power with the tendency that the greater the generated power, the greater the difference between the generated power and the first lower limit power is increased, thereby being able to suppress the deterioration of the fuel cell. The control device, for example, can suppress the deterioration of the fuel cell while suppressing the discrepancy between the power which is generated and the required power.

According to one or some exemplary embodiments of the disclosure, the control device can prevent a load from being applied to the power storage device by outputting making the fuel cell output the third power based on the limit value.

According to one or some exemplary embodiments of the disclosure, the control device can suitably set the first lower limit power in accordance with temperature or humidity.

Hereinafter, the embodiments of a power supply system, a power supply method, and a program of the disclosure will be described with reference to the drawings.

First Embodiment

Figure 1:
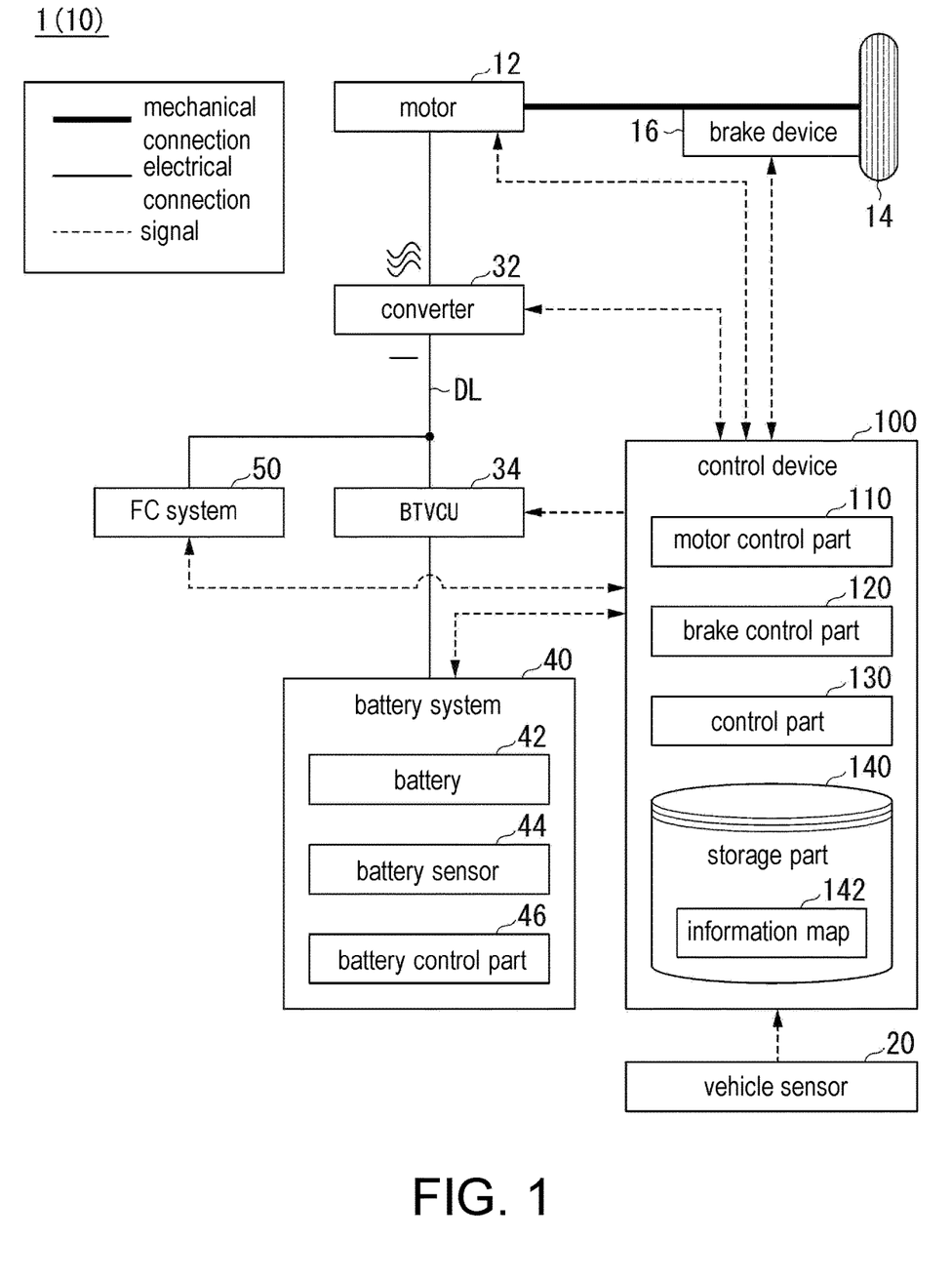
FIG. 1 is a diagram illustrating an example of a configuration of a vehicle system 10 including a power supply system.

[Electric Vehicle]
FIG. 1 is a diagram illustrating an example of a configuration of a vehicle system 10 including a power supply system. The vehicle system 10 is a system mounted in an electric vehicle 1. The electric vehicle 1 is a fuel cell vehicle using power generated in a fuel cell as the power for traveling. The vehicle system 10 at least includes a motor 12, a drive wheel 14, a brake device 16, a vehicle sensor 20, a converter 32, a battery voltage control unit (BTVCU) 34, a battery system 40, a fuel cell (FC) system 50, and a control device 100.

The motor 12, for example, is a three-phase AC motor. The rotor of the motor 12 is connected to the drive wheel 14. The motor 12 uses at least one of the power generated by the FC system 50 and the power stored in the battery system 40, and outputs a drive force used for traveling of the electric vehicle 1 to the drive wheel 14. The motor 12 generates power by using the motion energy of the electric vehicle 1 when the electric vehicle 1 decelerates.

The brake device 16, for example, includes a brake caliper, a cylinder transmitting a hydraulic pressure to the brake caliper, and an electric motor generating the hydraulic pressure to the cylinder. The brake device 16 may also include, as a back-up, a mechanism which transmits a hydraulic pressure generated by the operation of a brake pedal to the cylinder via a master cylinder. The brake device 16 may also be an electronically controlled hydraulic pressure brake device which transmits the hydraulic pressure of the master cylinder to the cylinder, without being limited to the above-described configuration.

The vehicle sensor 20 includes an accelerator opening degree sensor, a vehicle velocity sensor, and a brake stepping amount sensor. The accelerator opening degree sensor is attached to the accelerator pedal, detects the operation amount of the accelerator pedal, and outputs the accelerator opening degree to the control device 100. The vehicle velocity sensor, for example, includes a wheel velocity sensor attached to each wheel and a velocity computer, integrates the wheel velocities detected by the wheel velocity sensors to derive the velocity of the vehicle (vehicle velocity), and outputs the derived velocity to the control device 100. The brake stepping amount sensor is attached to the brake pedal, detects the operation amount of the brake pedal, and outputs the brake stepping amount as the detected operation amount to the control device 100.

The converter 32 is, for example, an AC-DC converter. An AC side terminal of the converter 32 is connected to a DC link DL. The battery system 40 is connected to the DC link DL via the BTVCU 34. The converter 32 converts the AC voltage generated by the motor 12 into a DC voltage and outputs the DC voltage to the DC link DL.

The BTVCU 34, for example, is a boosting DC-DC converter. The BTVCU 34 boosts the DC voltage supplied from the battery system 40 and outputs the boosted DC voltage to the DC link DL. The BTVCU 34 outputs the regenerative power supplied from the motor 12 or the power supplied from the FC system 50 to the battery system 40. In the embodiment, the vehicle system 10 is described as including the BTVCU 34. However, the BTVCU 34 may also be omitted.

The battery system 40, for example, includes a battery 42, a battery sensor 44, and a battery control part 46.

The battery 42, for example, is a secondary battery which can be charged and discharged repetitively, such as a lithium battery. The battery 42, for example, stores power generated in the motor 12 or the FC system 50, and supplies power to the motor 12 when the electric vehicle 1 travels.

The battery sensor 44 includes, for example, a current sensor, a voltage sensor, a temperature sensor. The battery sensor 44, for example, detects the current value, the voltage value, and the temperature of the battery 42.

The battery control part 46 derives the state of charge (SOC, also referred to as "battery charge rate" in the following) of the battery 42 and the electric power amount which the battery 42 can absorb based on the detection result of the battery sensor 44. The function of the battery control part 46 may also be provided in the control device 100.

The FC system 50 includes a fuel cell. The fuel cell generates power by reacting hydrogen included in fuel gas and oxygen included in air. The fuel system 50 outputs the generated power to the DC link DL, for example. The output power is supplied to the motor 12 via the converter 32, or is supplied to the battery 42 via the BTVCU 34.

The control device 100, for example, includes a motor control part 110, a brake control part 120, a control part 130, and a storage part 140. The motor control part 110, the brake control part 120, and the control part 130 may be respectively replaced with separate control devices, such as control devices known as a motor ECU, a brake ECU, a battery ECU, etc.

The storage part 140, for example, is realized by a storage device including a non-transient storage medium, such as a hard disk drive (HDD), a flash memory, an electrically erasable programmable read only memory (EEPROM), or a read only memory (ROM), or a random access memory (RAM), etc. The storage part 140 stores, for example, an information map 142. The information map 142 is a map used at the time of deriving an FCS lower limit power. The FCS lower limit power and the information map 142 will be described in detail in subsequent paragraphs.

The motor control part 110 derives a drive force required for the motor 12 based on the output of the vehicle sensor 20 and controls the motor 12 so as to output the derived drive force.

The brake control part 120 derives a braking force required for the brake device 16 based on the output of the vehicle sensor 20 and controls the brake device 16 so as to output the derived braking force.

[Control Part]

Figure 2:
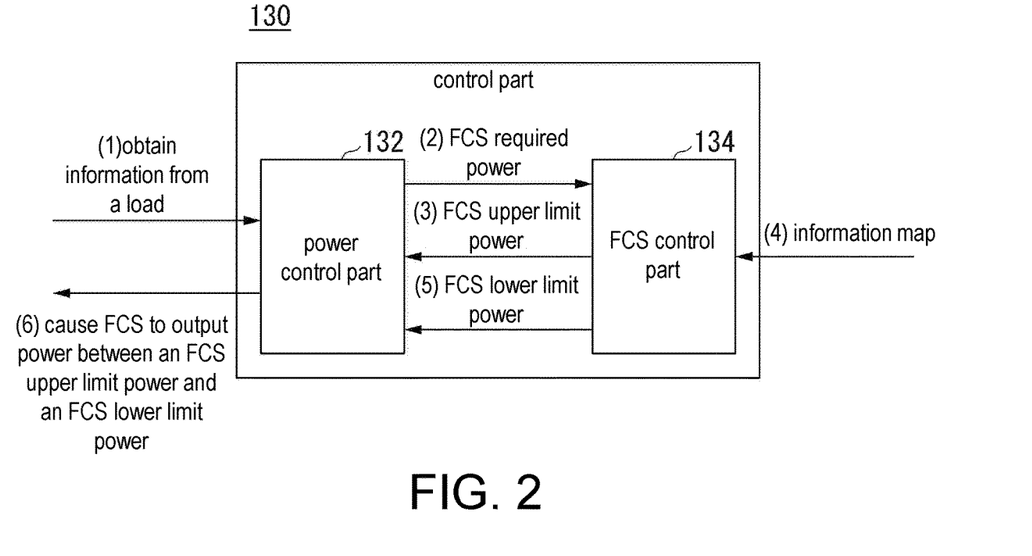
FIG. 2 is a diagram illustrating an example of a functional configuration of a control part 130.

FIG. 2 is a diagram illustrating an example of a functional configuration of the control part 130. The control part 130, for example, includes a power control part 132 and an FCS control part 134. The power control part 132, for example, is realized by executing a program (software) by a computer processor such as an electronic control unit (ECU), a central processing unit (CPU), etc. The power control part 132 may also be realized by hardware (circuit part, including a circuitry) such as a large scale integration (LSI) or an application specific integrated circuit (ASIC), a field-programmable gate array (FPGA), a graphic processing unit (GPU), etc., or may also be realized through hardware-software collaboration.

The FCS control part 134, for example, is realized by executing a program (software) by a computer processor such as an ECU or a CPU. The FCS part 134 may also be realized by hardware (circuit part) such as an LSI or an ASIC, an FPGA, a GPU, etc., or may also be realized through hardware-software collaboration.

The program may be stored in advance in the storage part 140 as shown in the drawing, or stored in a detachable storage medium (non-transient storage medium) such as a DVD or a CD-ROM and installed in the storage part 140 by mounting the storage medium to a drive device.

The power control part 132 and the FCS control part 134 may be integrated, or one or both of the power control part 132 and the FCS control part 134 may be included in a device different from the control device 100.

The power control part 132 performs energy management based on the power required in the electric vehicle 1. The power required in the electric vehicle 1 refers to the power which the motor 12 requires in accordance with the accelerator pedal operation of the occupant and the power required by an apparatus consuming power in the electric vehicle 1, such as power consumed by a vehicle-mounted apparatus not shown herein. The energy management is to determine, by the power control part 132, the power to be output to the FC system 50 and the power to be discharged to the battery 42. The FCS control part 134 derives an FCS upper limit power and the FCS lower limit power.

[Process of Control Part]

In the following, an example of the control executed by the control part 130 is described. The control part 130 repetitively executes processes (1) to (5) in a predetermined period.

(1) The power control part 132 obtains information from a load (the motor 12 or the vehicle-mounted apparatus) mounted in the electric vehicle 1. The information is the information of the required power which a load requires, such as an indication value applied to the motor 12 or an indication value applied to the vehicle-mounted apparatus, or the information for deriving the required power.

(2) The power control part 132 derives the FCS required power based on the required power obtained in (1). The FCS required power is the power generated by the fuel cell of the FC system 50. (3) Then, the FCS control part 134 derives the FCS upper limit power. The FCS control part 134, for example, derives the FCS upper limit power based on the FCS system 50 itself or an environment factor (temperature), the state of the FCS system 50 (e.g., whether there is a failure), etc. For example, in the case where the environmental factor is in a predetermined state (the temperature is equal to or lower than a threshold), and the FC system 50 does not have a failure, the FCS upper limit power is the rated power which the FC system 50 outputs.

(4), (5) Then, the control part 134 refers to the information map 142 and derives the FCS lower limit power. (6) The power control part 132 sets a power between the FCS upper limit power and the FCS lower limit power as a set power and outputs the set power to the FC system 50.

Figure 11:
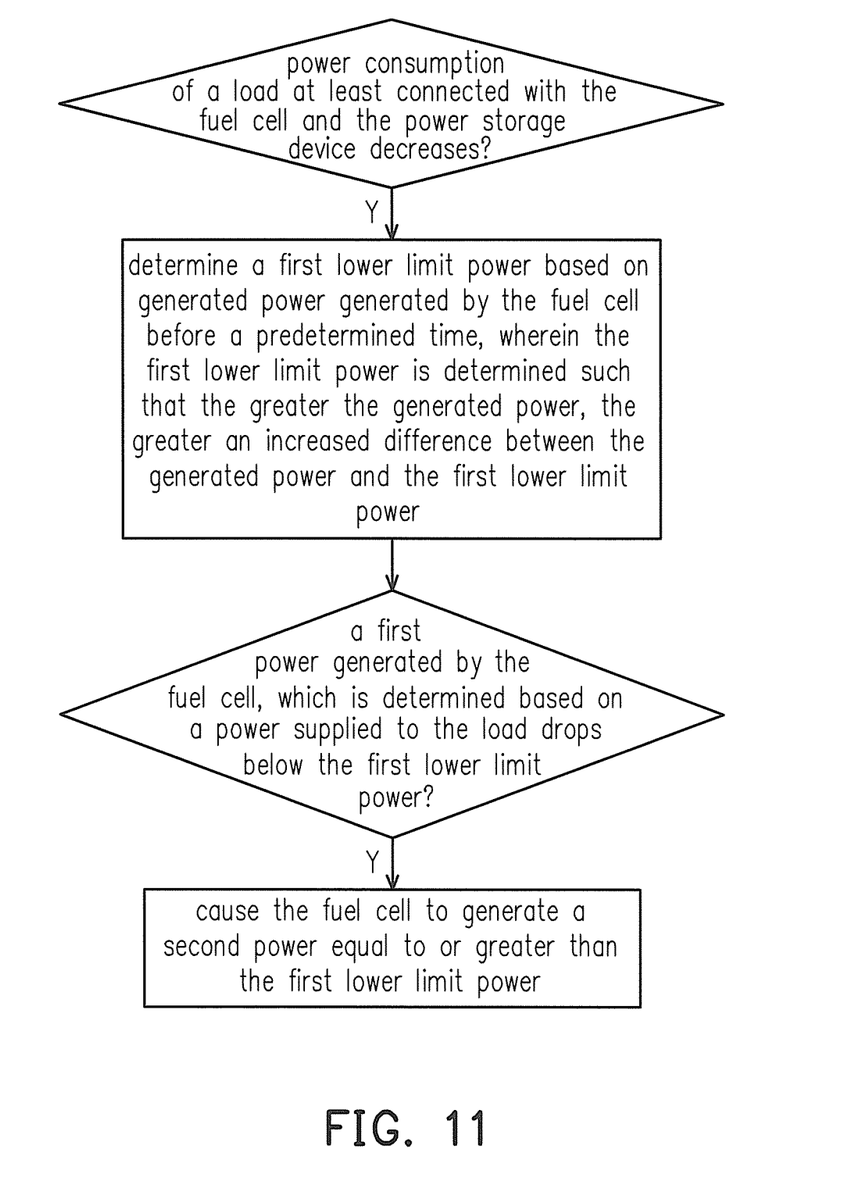
FIG. 11 shows the limitation of the first lower limit power.

At least in the case with a tendency that the consumed power of the load decreases, the FCS control part 134 determines a first lower limit power based on the generated power (or the output power that is output) generated by the FC system 50 before a predetermined time. In the case where the FCS required power (first power) generated by the FC system 50, which is determined based on the power supplied to the load, is equal to or greater than the first lower limit power, the FCS control part 134 causes the FC system 50 to generate the FCS required power. However, in the case where the FCS required power exceeds the upper limit, for example, the power control part 132 causes the FC system 50 to generate power equal to or less than the upper limit. In the case where the FCS required power generated in the FC system 50, which is determined based on the power supplied to the load, drops below the first lower limit power, the FCS control part 134 causes the FC system 50 to generate the set power (second power) equal to or greater than the first lower limit power, and determines the first lower limit power with a tendency that the greater the generated power, the greater the difference between the generated power and the first lower limit power is increased (as shown in FIG. 11).

Figure 3:
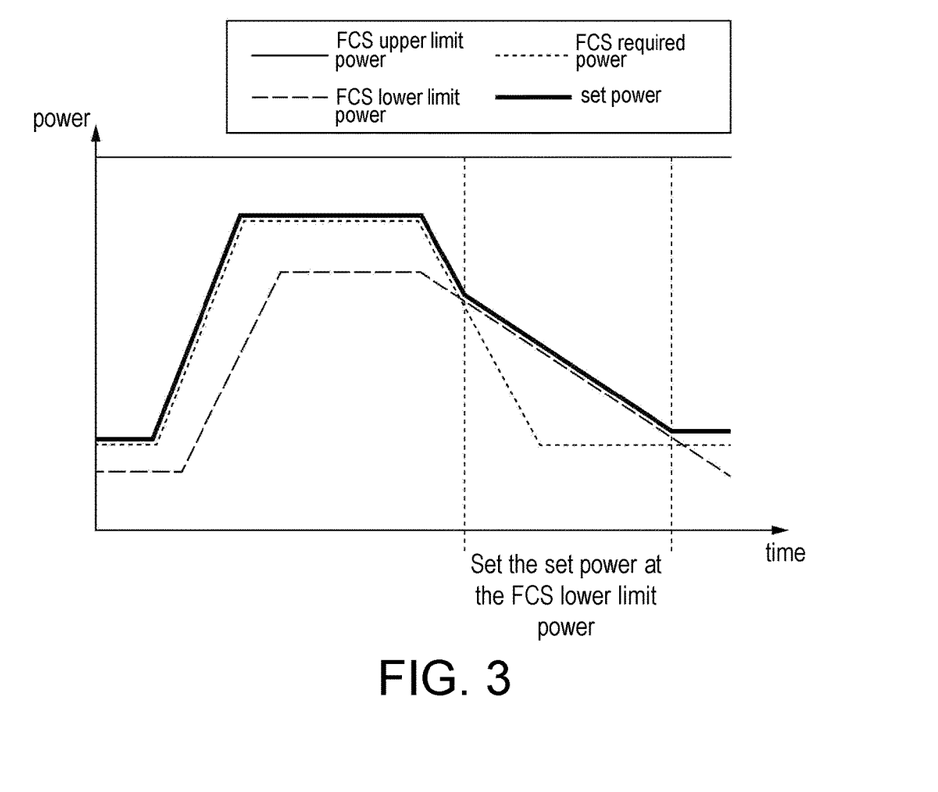
FIG. 3 is a diagram for explaining an FCS upper limit power, an FCS lower limit power, an FCS required power, and a set power.

FIG. 3 is a diagram for explaining the FCS upper limit power, the FCS lower limit power, the FCS required power, and the set power. The vertical axis of FIG. 3 represents the amplitude of power, and the horizontal axis of FIG. 3 represents time. In the case with a tendency that the FCS required power increases, or in the case where the displacement of the FCS required power is small, the FCS required power is in principle in an amplitude between the FCS upper limit power and the FCS lower limit power. In this case, the set power is set to be equal to the FCS required power.

In the case where the FCS required power is in a decreasing tendency greater than a predetermined degree, the FCS required power may become smaller than the FCS lower limit power. In this case, the set power is set to be equal to the FCS lower limit power.

As described above, the power control part 132 can suppress the deterioration of the fuel cell by controlling the set power to be not less than the FCS lower limit power.

[Means for Deriving FCS Lower Limit Power]

Figure 4:
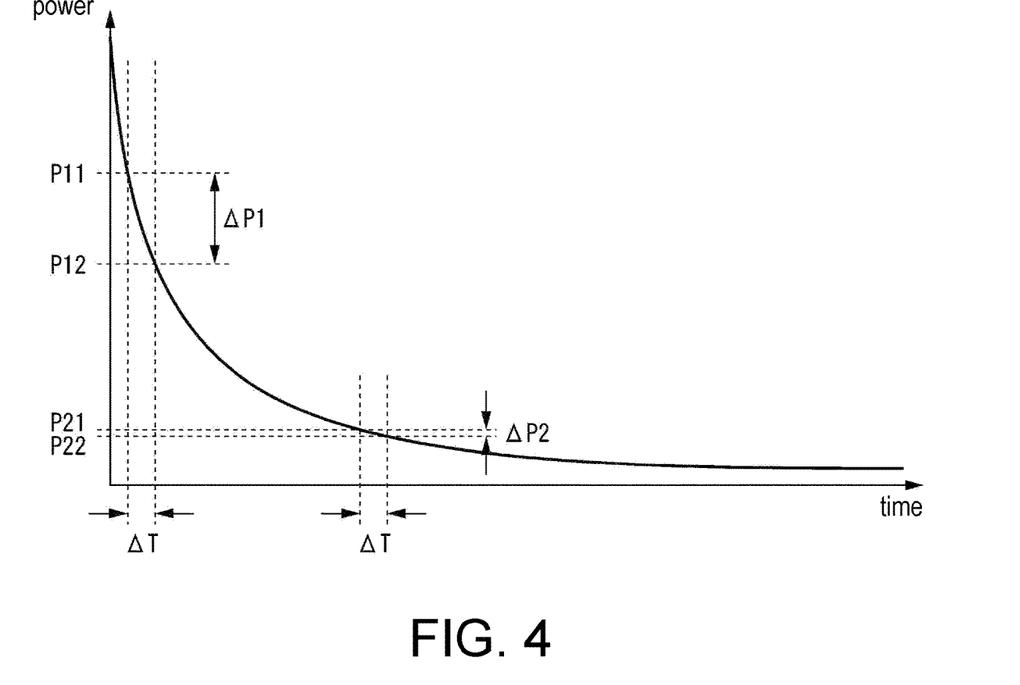
FIG. 4 is a diagram illustrating an example of contents of an information map 142.

The power control part 132 refers to the information map 142 and derives the FCS lower limit power. FIG. 4 is a diagram illustrating an example of contents of the information map 142. The vertical axis of FIG. 4 represents the amplitude of power, and the horizontal axis of FIG. 4 represents time. The transition line of FIG. 4 illustrates the variation amount of the power generated by the FC system 50 (fuel cell) permitted at each time. The FCS lower limit power at a moment (current lower limit power) is derived based on the set power at a moment before a predetermined time (previous set time or power generated in a process one routine before).

For example, in the case where the previous set power is "P11", the FCS lower limit power at the timing when the next set power is derived is "P12" after passing of a time $\Delta T$. That is, after the time $\Delta T$ from the set power P11, the power reduced from the set power P11 by a power $\Delta P1$ is an FCS lower limit power P12.

For example, in the case where the previous set power is "P21", the FCS lower limit power at the timing when the next set power is derived is "P22" after passing of the time $\Delta T$. That is, after the time $\Delta T$ from the set power P21, the power reduced from the set power P21 by the power $\Delta P2$ is an FCS lower limit power P22. The power $\Delta P2$ is less than the power $\Delta P1$.

As shown in FIG. 4, in the case where the time is the same between the moment at which the previous set power is derived (or output) and the moment at which the next set power is derived, the greater the previous set power, the greater the difference between the previous set power and the current FCS lower limit power is increased.

In the above example, the FCS lower limit power is described as being derived based on a map in which power is associated with time (an example of "information in which the generated power is associated with the first lower limit power"). However, as a substitute thereof (or an addition thereto), the FCS lower limit power may also be derived based on a table in which the previous set power is associated with the FC lower limit power (another example of "information in which the generated power is associated with the first lower limit power") or a function included and called in a program and deriving the FCS lower limit power based on power (another example of "information in which the generated power is associated with the first lower limit power"). In addition, the map is not limited to being non-linear, but may also be linear or step-like.

[Transition Example 1 of Set Power and FCS Lower Limit Power]

Figure 5:
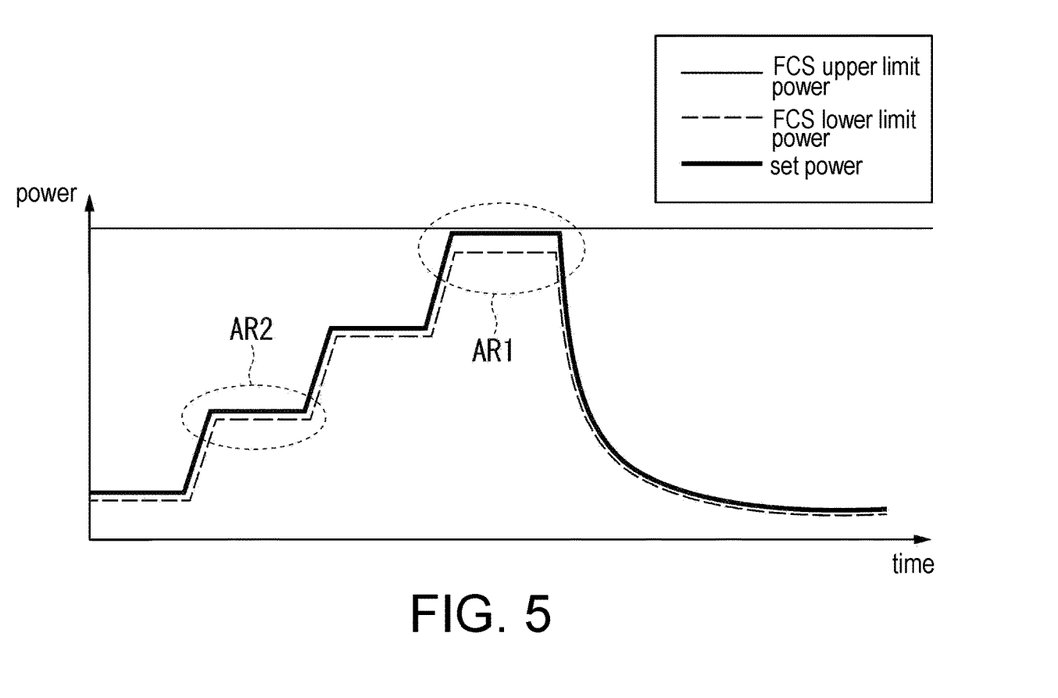
FIG. 5 is a (first) diagram for explaining a transition example between the set power and the FCS lower limit power.

FIG. 5 is a (first) diagram for explaining a transition example between the set power and the FCS lower limit power. Descriptions repeating those of FIG. 3 will be omitted. For example, in the case with a tendency that the FCS required power (not shown) increases (the load, such as the motor 12, tends to increase), the FCS required power becomes greater than the FCS lower limit power. In this case, the set power is set at the FCS required power, for example. For example, the difference between the set power (FCs required power) and the FCS lower limit power in a region AR1 in which the set power is large becomes greater than the difference between the set power (FCS required power) and the FCS lower limit power in a region AR2 in which the set power is less than that of the region AR1. That is, the larger the set power one routine before, the higher the degree of freedom of the set power which can be set in the current routine.

For example, in the case where the FCS required power (not shown) is equal to or greater than a predetermined degree and in a decreasing tendency (the case where the load, such as the motor 12, is equal to or greater than the predetermined degree and in a decreasing tendency) or changed to exhibit a decreasing tendency, the FCS required power may become smaller than the FCS lower limit power. In such case, the set power, for example, is set to the FCS lower limit power, and the set power as shown in FIG. 5 is set to the FCS lower limit power, for example.

[Transition Example 2 of Set Power and FCS Lower Limit Power]

Figure 6:
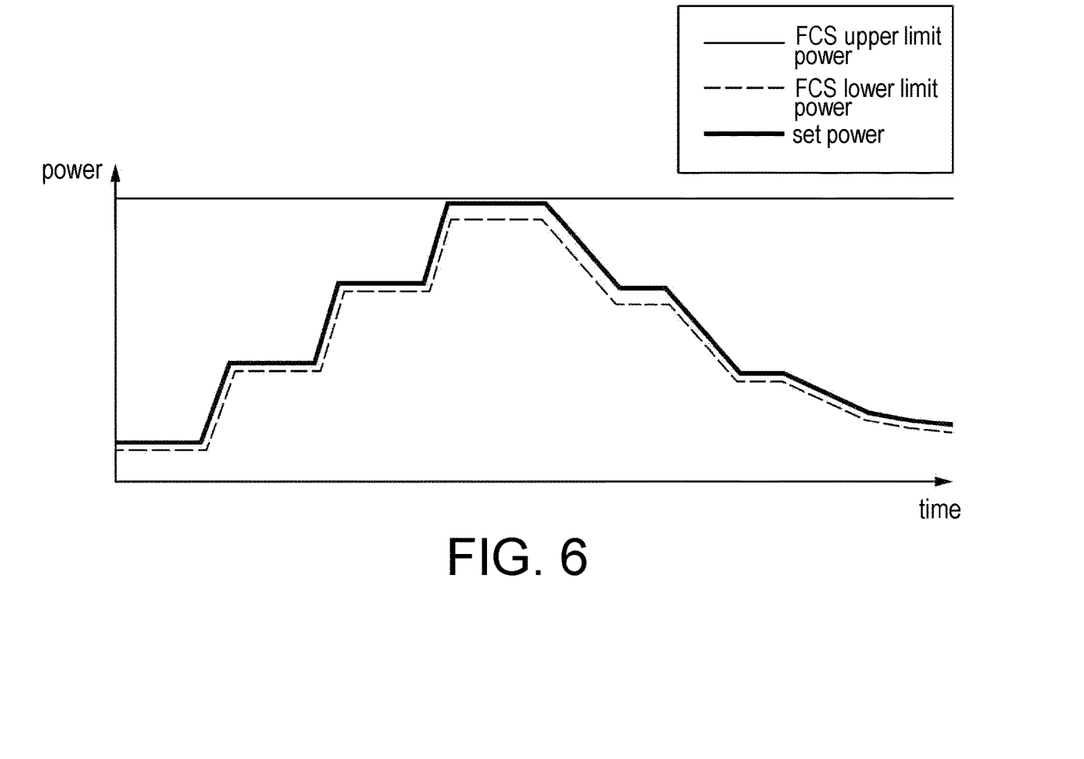
FIG. 6 is a (second) diagram for explaining a transition example between the set power and the FCS lower limit power.

FIG. 6 is a (second) diagram for explaining a transition example between the set power and the FCS lower limit power. Descriptions repeating those of FIGS. 3 and 5 will be omitted. For example, in the case where the FCS required power (not shown) is in a slowly decreasing tendency (the case where the load, such as the motor 12, is in a slowly decreasing tendency, the case where the load, such as the motor 12, is equal to or greater than the predetermined degree and in a decreasing tendency), the FCS required power is greater than the FCS lower limit power. In this case, the set power is set at the FCS required power, for example.

As described above, the power control part 132 can suppress the deterioration of the FC system 50 by controlling the FC system 50 so that the set power is not less than the FCS lower limit power.

[Regarding Deterioration of FC System (Fuel Cell)]

For example, after the occupant operates the accelerator pedal to accelerate the electric vehicle 1, in the case where the foot leaves the accelerator pedal, the power required by the motor 12 may decrease drastically. In such case, the FCS required power may drop below the FCS lower limit power. When the FC system 50 generates power smaller than the FCS lower limit power, such case may contribute to the deterioration of the FC system 50.

Figure 7:
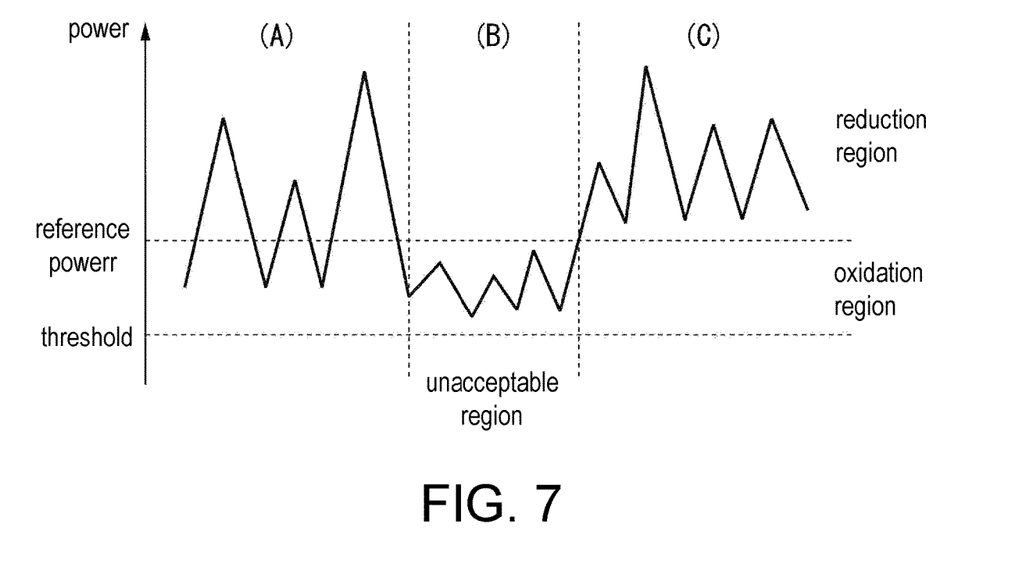
FIG. 7 is a diagram for explaining deterioration of an FC stack.

FIG. 7 is a diagram for explaining the deterioration of an FC stack. For example, the region in which the power generated by the FC system 50 is equal to or less than a reference value is an oxidation region, and the region in which the power generated by the FC system 50 exceeds the reference value is a reduction region. The region in which the power generated by the FC system 50 is equal to or less than a threshold is an unacceptable region which is not a control target due to a large deterioration degree.

When the power generated by the FC system 50 fluctuates between the oxidation region and the reduction region as shown in (A) of FIG. 7 or fluctuates within the reduction region as shown in (B) of FIG. 7, deterioration may easily occur. In particular, the fluctuations shown in (A) of FIG. 7 have a fluctuation degree greater than the fluctuations shown in (B) of FIG. 7. Comparatively, as shown in (C) of FIG. 7, the fluctuations in the reduction region are permitted as the deterioration degree is relatively small.

Under such consideration, the power generated by the FC system is controlled to control deterioration, so that power fluctuations without crossing between the reduction region and the oxidation region are permitted in a region in which the power is relatively high (the reduction region exceeding the reference) and large fluctuations which cross between the reduction region and the oxidation region are not permitted but only small fluctuations are permitted in a region in which the power is relatively small (the oxidation region equal to or less than the reference). The deterioration refers to, for example, the performance deterioration of the FC system 50 due to electrode deterioration.

[Regarding Control Taking Battery Limit Value into Consideration]

The power control part 132 may also determine the set power further based on a BAT limit value. In the case where the FCS required power drops below the FCS lower limit power and the FCS lower limit power exceeds the BAT limit value set based on the power which the battery 42 is able to store, the power control part 132 causes the FC system 50 to generate a set power (third power) based on the BAT limit value. The set power based on the BAT limit value refers to, for example, power equal to or less than the BAT limit value, power less than the BAT limit value, or power exceeding the BAT limit value only by a small degree. In the case where the FCS required power drops below the FCS lower limit power and the FCS lower limit power is equal to or less than the BAT limit value, the power control part 132 sets the set power to the FCS lower limit power and causes the FCS system 50 to generate the set power.

The BAT limit value is a limit value provided to protect the battery 42. When the FC system 50 generates power exceeding the BAT limit value, it is possible that an event adverse to the battery 42 may occur. The adverse event for the battery refers to, for example, that power which the battery 42 is unable to absorb is supplied to the battery 42.

Figure 8:
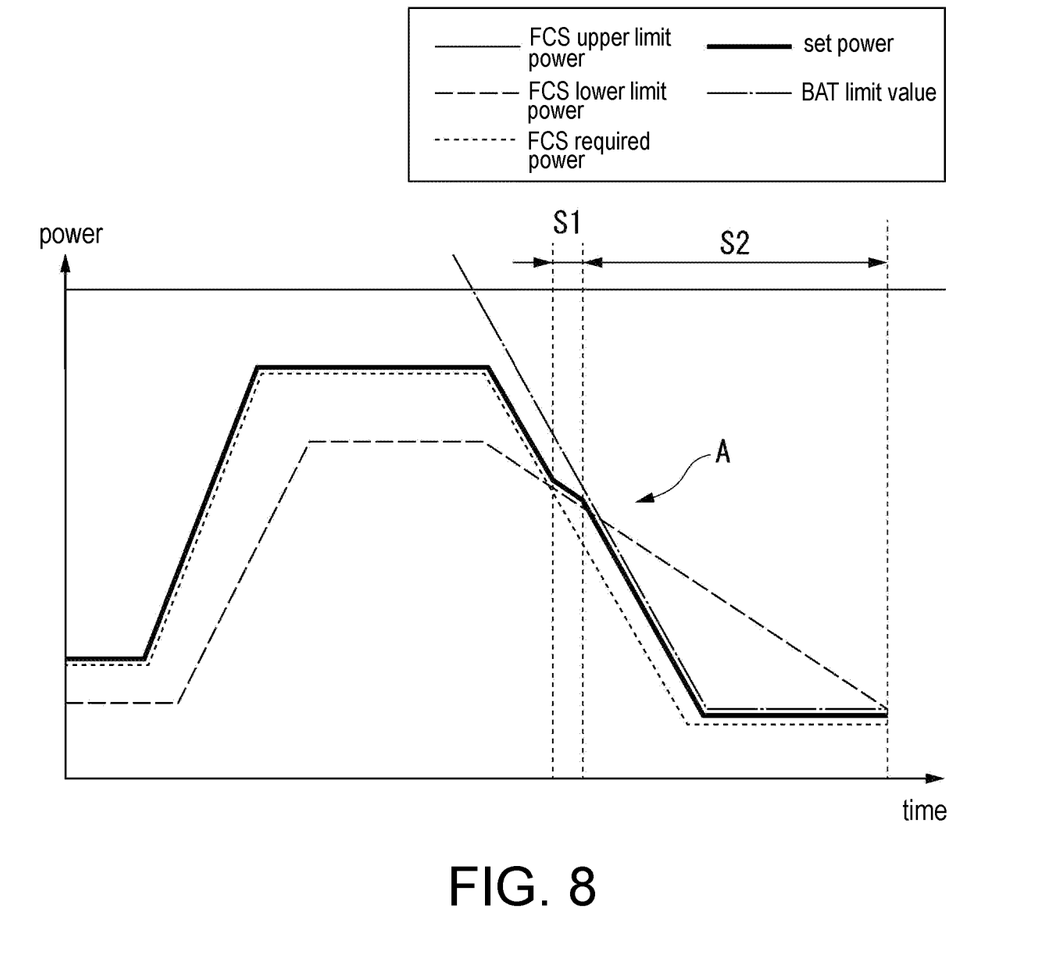
FIG. 8 is a diagram for explaining control in which a battery limit value is considered.

FIG. 8 is a diagram for explaining control in which a battery limit value is considered. Descriptions repeating those of FIG. 3 will be omitted. The power control part 132 sets the set power to be equal to or less than the BAT limit value or to be smaller than the BAT limit value. In the example of FIG. 8, in the case where the FCS required power is less than or equal to the BAT limit value and the FCS lower limit power, and the FCS lower limit power is less than or equal to the BAT limit value, the set power is set at the FCS lower limit power ("S1" in FIG. 8), and in the case where the FCS lower limit power is greater than the BAT limit value, the set power is set at the BAT limit value ("S2" in FIG. 8).

Formulae (1) to (3) in the following will be described. "FCp" in Formula (1) refers to the power generated by the FC system 50, "Cp" in Formula (1) refers to the power consumed by the motor 12 and the vehicle-mounted apparatus of the electric vehicle 1. The power obtained by subtracting Cp from FCp is a power Bp flowing to the battery 42. "Rp" in Formula (2) or Formula (3) is the power which the battery 42 is able to absorb. "Bp1" in Formula (3) is the maximum power which the battery 42 is able to store or the rated power, and "Bp2" is the power stored in the battery 42. "Rp" is the power obtained by subtracting Bp2 from Bp1.

$$FCp - Cp = Bp \quad (1)$$

$$Bp > Rp \quad (2)$$

$$Bp1 - Bp2 = Rp \quad (3)$$

As shown in Formula (2) above, in the case where Bp is greater than Rp, the battery 42 is unable to entirely absorb BP, which is the remaining power. Such case is adverse to the battery 42.

Comparatively, in the embodiment, the power generation of the FC system 50 is controlled, so that BP is not greater than Rp. For example, in order for Bp to be equal to or less than Rp, FCp is derived from the BAT limit value so that FCp is equal to or less than the sum of Cp and Rp based on Formula (1) above. That is, in the case assuming that the motor 12 and the vehicle mounted apparatus are unable to consume the power generated by the FC system 50 and the battery 42 is unable to absorb the power which is unable to be consumed, the control device 100 suppresses the power generated by the FC system 50 to the power which the battery 42 is able to absorb. Accordingly, the deterioration of the battery 42 can be suppressed. Although it is possible that the required power is equal to or less than the FCS lower limit power, the suppression against exceeding the BAT limit value is prioritized over preventing the required power from being equal to or less than the FCS lower limit power to suppress the deterioration of the battery 42, and the commercial value is further facilitated when the electric vehicle 1 is under comprehensive consideration.

[Flowchart]

Figure 9:
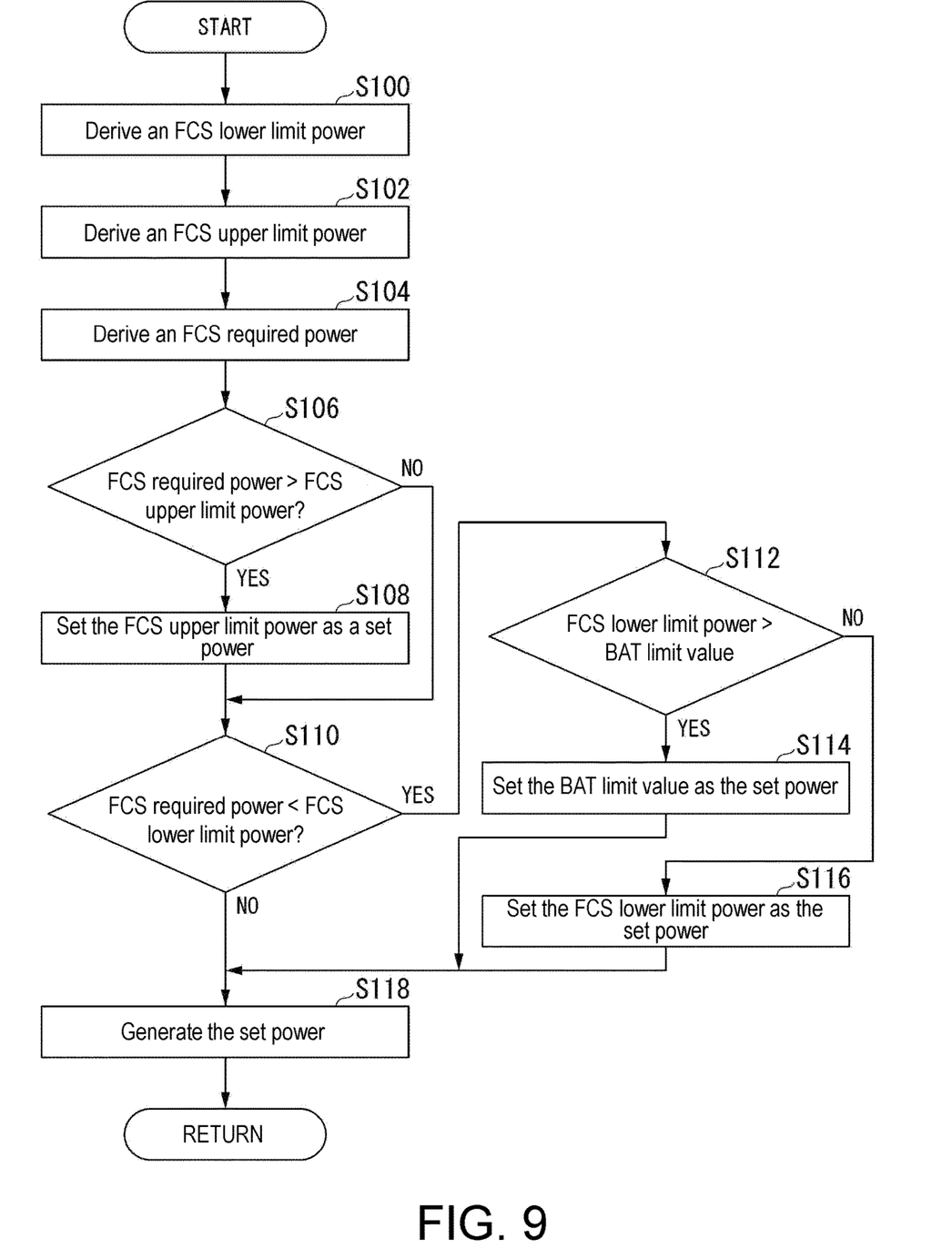
FIG. 9 is a flowchart illustrating an example of a flow of a process executed by the control part 130.

FIG. 9 is a flowchart illustrating an example of a flow of a process executed by the control part 130. The process is executed repetitively at a predetermined interval. Also, the process may also be executed in the case where the power consumption of the load (the motor 12 or the vehicle mounted apparatus) does not have an increasing tendency. For example, the process may be executed in the case where the power consumption of the load has a decreasing tendency or the case where the power consumption of the load fluctuate within a predetermined range.

Firstly, the control part 130 derives the FCS lower limit power (Step S100) and derives the FCS upper limit power (Step S102). Then, the control part 130 derives the FCS required power (Step S104).

Then, the control part 130 determines whether the FCS required power exceeds the FCS upper limit power (Step S106). In the case where the FCS required power is determined as exceeding the FCS upper limit power, the control part 130 sets the FCS upper limit power as the set power (Step S108). Then, the process of Step S110 is carried out.

In the case where the FCS required power is determined as not exceeding the FCS upper limit power, the control part 130 determines whether the FCS required power is less than the FCS lower limit power (Step S110). In the case where the FCS required power is not less than the FCS lower limit power, the process of Step S118 is performed. In such case, the control part 130 determines whether the FCS required power is greater than the BAT limit value. In the case where the FCS required power is determined as greater than the BAT limit value, the set power may also be set to be equal to or less than the BAT limit value (equal to or greater than the FCS lower limit power and equal to or less than the BAT limit value).

In the case where the FCS required power is less than the FCS lower limit power, the control part 130 determines whether the FCS lower limit power is greater than the BAT limit value (Step S112). The control part 130 may also determine whether the FCS lower limit power is greater than a device protection value. The device protection value refers to a power value set for protecting a device mounted in the electric vehicle 1. The BAT limit value is an example of the device protection value.

In the case where the FCS lower limit power is greater than the BAT limit value, the control part 130 sets the BAT limit value as the set power (Step S114). In the case where the FCS lower limit power is not greater than the BAT limit value, the control part 130 sets the FCS limit value as the set power (Step S116). In the case where the determination result in Step S100 is affirmative, after the process of Step S114 or after the process of Step S116, the control part 130 causes the FC system 50 to generate the set power (Step S118). Accordingly, the process of one routine of the flowchart ends.

According to the above process, the deterioration of the fuel cell can be suppressed by determining, by the control part, the FCS lower limit power with the tendency that the greater the generated power (the previous generated power), the greater the difference between the generated power and the FCS lower limit power is increased (as shown in FIG. 11). The control part 130, for example, can suppress the deterioration of the fuel cell while suppressing the discrepancy between the power which is generated and the required power.

[Control Taking Temperature or Humidity into Consideration]

Figure 12:
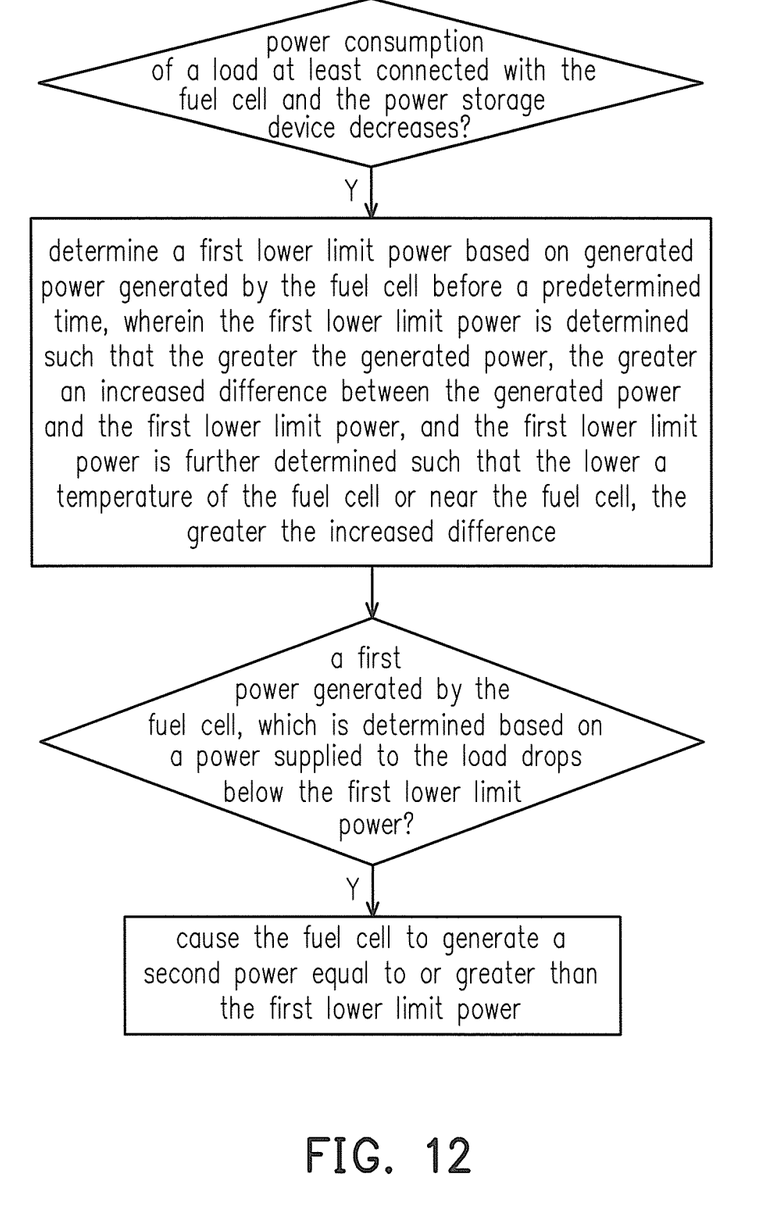
FIG. 12 shows a further limitation of the first lower limit power in addition to FIG. 11.
Figure 13:
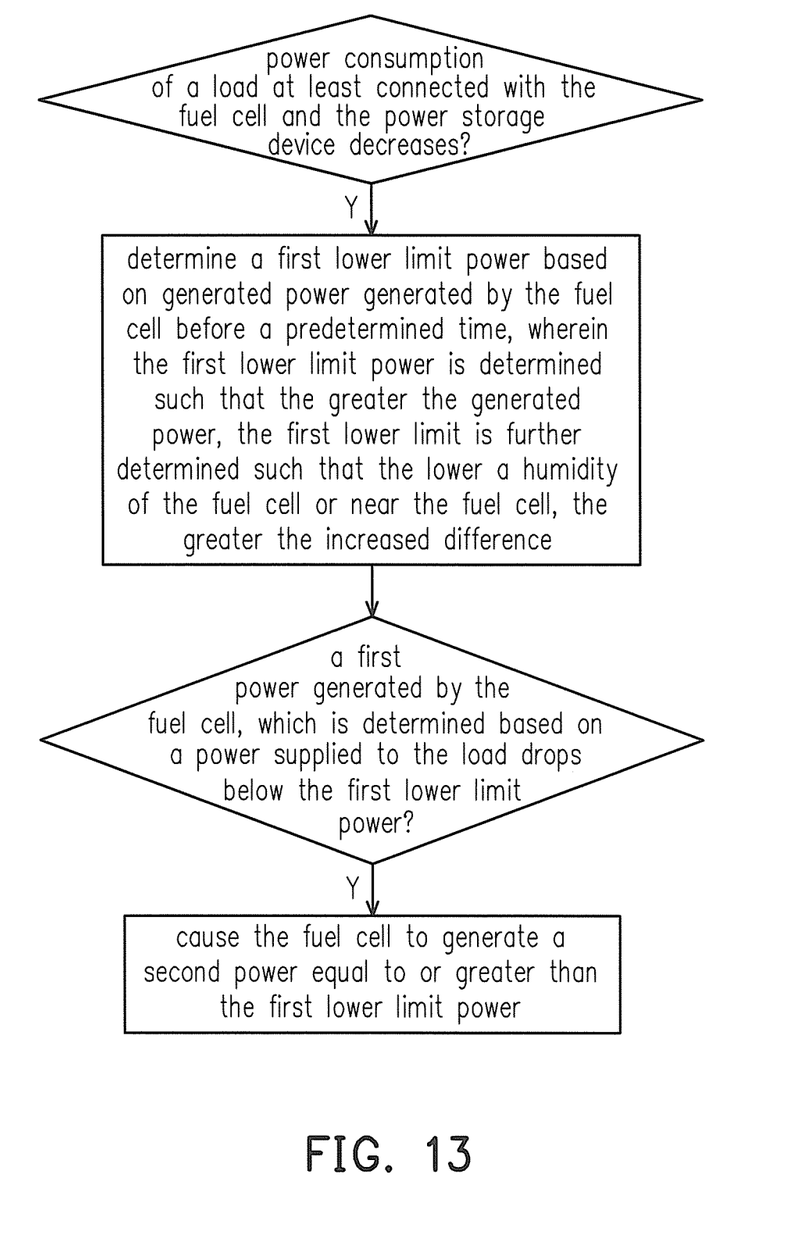
FIG. 13 shows a further limitation of the first lower limit power in addition to FIG. 11.

The control part 130 may further determine the FCS lower limit power in consideration of temperature or humidity. The deterioration of the fuel cell includes electrode deterioration or electrolyte membrane deterioration. When electrode deterioration is considered, compared with the case where the temperature is high, the case where the temperature is low permits an increased difference between the generated power and the FCS lower limit power (as shown in FIG. 12), and compared with the case where the humidity is high, the case where the humidity is low permits an increased difference between the generated power and the FCS lower limit power (as shown in FIG. 13). When electrolyte membrane deterioration is considered, compared with the case where the temperature is high, the case where the temperature is low permits an increased difference between the generated power and the FCS lower limit power, and compared with the case where the humidity is low, the case where the humidity is high permits an increased difference between the generated power and the FCS lower limit power.

For example, in the case where the suppression of electrode deterioration is considered, the control may be as follows. Compared with the case where the temperature of the fuel cell or near the fuel cell is high, in the case where the temperature of the fuel cell or near the fuel cell is low, the control part 130 determines with the FCS lower limit power with the tendency that the greater the generated power generated in the previous process, the greater the difference between the generated power and the FCS lower limit power is further increased. That is, the control part 130 determines the first lower limit power with the tendency that the lower the temperature of the fuel cell or near the fuel cell, the greater the difference between the generated power and the FCS lower limit power is further increased with respect to the increase of the generated power.

Compared with the case where the humidity of the fuel cell or near the fuel cell is high, in the case where the humidity of the fuel cell or near the fuel cell is low, the control part 130 determines the FCS lower limit power with the tendency that the greater the generated power, the greater the difference between the generated power and the FCS lower limit power is further increased. That is, the control part 130 determines the first lower limit power with the tendency that the lower the humidity of the fuel cell or near the fuel cell, the greater the difference between the generated power and the FCS lower limit power is further increased with respect to the increase of the generated power.

Figure 10:
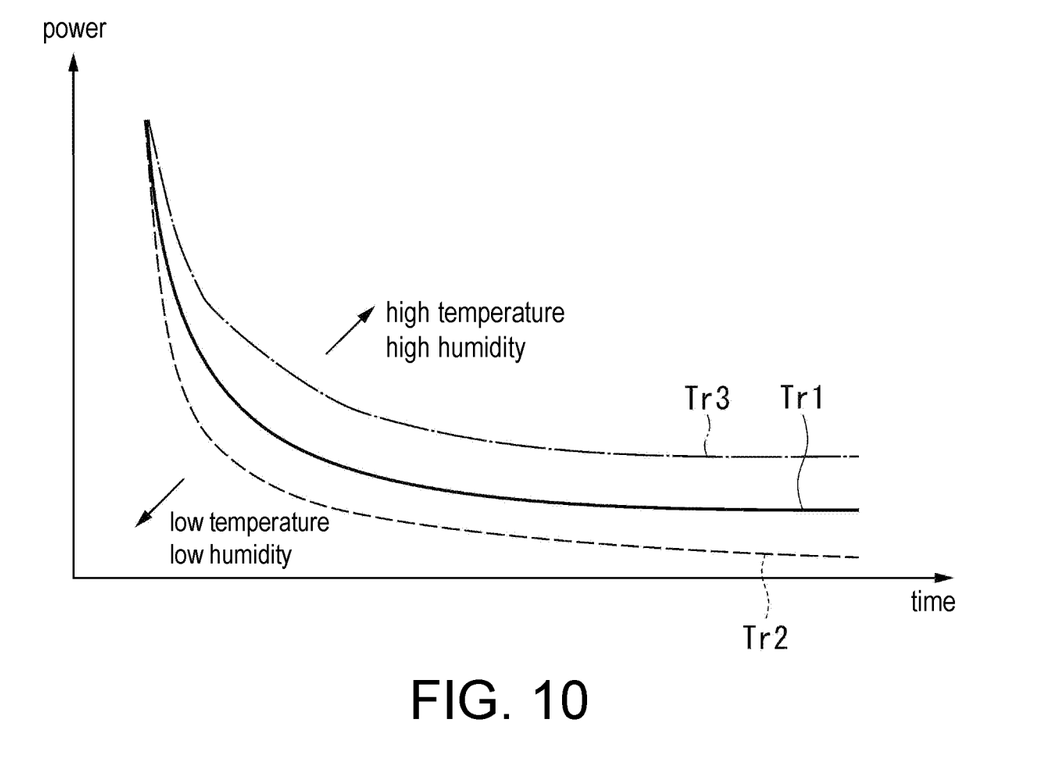
FIG. 10 is a diagram illustrating an example of the power variation degree permitted at each time with variation of temperature or humidity.

FIG. 10 is a diagram illustrating an example of the power variation degree permitted at each time with variation of temperature or humidity. Descriptions same as those of FIG. 4 will be omitted. For example, in the case with the tendency that the temperature is low with respect to the reference temperature or the humidity is low with respect to the reference humidity, the permitted variation degree tends to be greater. As shown in FIG. 10, a transition line Tr2 is in a shape closer to the vertical axis or the horizontal axis than a transition line Tr1 as the reference. The transition line Tr1 which serves as the reference is a transition line corresponding to the reference temperature or the reference humidity.

For example, in the case with the tendency that the temperature is high with respect to the reference temperature or the humidity is high with respect to the reference humidity, the permitted variation degree tends to be smaller. As shown in FIG. 10, a transition line Tr3 is in a shape more distant to the vertical axis or the horizontal axis than the transition line Tr1 as the reference.

For example, the control part 130 determines the FCS lower limit power by taking into consideration the temperature or the humidity obtained by a sensor provided at a predetermined position. The predetermined position is a position where the sensor is able to detect the temperature or the humidity that affects the determination on the FCS lower limit power. The predetermined position may be in the FC system 50, and may also be in the housing in which the FCS system is accommodated or the periphery thereof.

By further considering temperature or humidity, the control part 130 is able to more accurately derive the FCS lower limit power. The FCS lower limit power which affects the deterioration of the FC system 50 changes with temperature or humidity. Therefore, by taking temperature or humidity into consideration as described above, the deterioration is suppressed without excessively limiting the power generated by the FC system 50. In addition, the map of FIG. 10 is not limited to being non-linear, but may also be linear or step-like. In addition, in place of the map corresponding to temperature or humidity, a table or a function taking temperature or humidity into consideration may also be used to derive the FCS lower limit power.

For example, in the case where the suppression of electrolyte membrane deterioration is considered, the control may be as follows. The description will focus on the difference with respect to the control in the case where the suppression of electrode deterioration is considered. Compared with the case where the humidity of the fuel cell or near the fuel cell is low, in the case where the humidity of the fuel cell or near the fuel cell is high, the control part 130 determines the FCS lower limit power with the tendency that the greater the generated power generated in the previous process, the greater the difference between the generated power and the FCS lower limit power is further increased. That is, the control part 130 determines the first lower limit power with the tendency that the higher the humidity of the fuel cell or near the fuel cell, the greater the difference between the generated power and the FCS lower limit power is further increased with respect to the increase of the generated power.

For example, in the control of the embodiment, the FCS lower limit power may be determined by performing the control taking electrode deterioration into consideration, performing the control taking electrolyte membrane deterioration into consideration, or performing control taking both into consideration. For example, in the case where the electrode deterioration and the electrolyte membrane are both taken into consideration, the FCS lower limit power is derived based on a map or a table defining a relationship between temperature as well as humidity and the FCS lower limit power set in advance in accordance with the degree of the deterioration under consideration or the property of the fuel cell or a function which derives the FCS lower limit power based on temperature or humidity. Accordingly, the control taking into consideration the properties or the usage environment (temperature, humidity) of the fuel cell, the deterioration under consideration, etc., is realized. For example, in the case where the electrolyte membrane deterioration is more permissible than the electrode deterioration, the case where the fuel cell is more susceptible to the electrode deterioration than the electrolyte membrane deterioration, when the humidity is low, the first lower limit power is determined with the tendency that the difference between the generated power and the FCS lower limit power is increased with respect to the increase of the generated power.

According to the above, by further considering electrode deterioration, electrolyte membrane deterioration, temperature, and humidity, the control part 130 can more accurately derive the FCS lower limit power in accordance with the properties of the fuel cell and the usage environment.

According to the embodiment described above, at least in the case with the tendency that the power consumption of the load decreases, the control device 100 determines the first lower limit power based on the generated power generated by the fuel cell before the predetermined time, causes the fuel cell to generate the second power equal to or greater than the first lower limit power in the case where the first power generated by the fuel cell, which is determined based on the power supply to the load, drops below the first lower limit power, and determines the first lower limit power with the tendency that the greater the generated power, the greater the difference between the generated power and the first lower limit power is increased, thereby being able to suppress the deterioration of the fuel cell.

The control device 100 may also determine the first lower limit power based on the generated power generated by the fuel cell before the predetermined time in the case with the tendency that the power consumption of the load decreases, and cause the fuel cell to generate the second power equal to or greater than the first lower limit power in the case where the first power generated by the fuel cell determined based on the power supplied to the load drops below the first lower limit power. Moreover, in such case, in the case where the first power drops below the first lower limit power and the first lower limit power exceeds a limit value set based on the power which the power storage device is able to store, the control device 100 may also cause the fuel cell to generate the second power so as not to exceed the limit value. Accordingly, the control device 100 can suppress the deterioration of the fuel cell without applying a load to the storage device.

In addition, the control device 100 may also cause the fuel cell to generate the first power exceeding the first lower limit value in the first moment, determine the second power generated by the fuel cell based on the power supplied to the load in the second moment after the first moment and with the tendency that the electric power consumed by the load decreases with respect to the state of the load of the first moment, and cause the fuel cell to generate the third power equal to or greater than the second lower limit power in the case where the second power drops below the second lower limit power. The second lower limit power is defined by the first power and the interval between the first moment and the second moment. In addition, the greater the power, the greater the variation of the second lower limit power with respect to the first lower limit power.

Although the embodiments for carrying out the disclosure have been described above using the examples, the disclosure is not limited to these examples, and various modifications and substitutions can be added without departing from the gist of the disclosure.

What is claimed is:

1. A power supply system, comprising:
   a fuel cell, capable of generating power;
   a power storage device, storing power generated by the fuel cell; and
   a control device, controlling at least the fuel cell,
   wherein the control device is configured to:
   in a case that power consumption of a load at least connected with the fuel cell and the power storage device decreases,
   determine a first lower limit power based on generated power generated by the fuel cell before a predetermined time;
   cause the fuel cell to generate a second power equal to or greater than the first lower limit power in a case where a first power generated by the fuel cell, which is determined based on a power supplied to the load, drops below the first lower limit power; and
   wherein the first lower limit power is determined such that the greater the generated power, the greater an increased difference between the generated power and the first lower limit power.

2. The power supply system as claimed in claim 1, wherein the control device is configured to: in a case where the first power drops below the first lower limit power and the first lower limit power exceeds a limit value set based on a power which the power storage device is able to store, cause the fuel cell to generate a third power, in place of the second power, based on the limit value.

3. The power supply system as claimed in claim 1, wherein the control device is configured to determine the first lower limit power,
   wherein the first lower limit power is derived from a map in which the generated power generated by the fuel cell is associated with time; or
   the first lower limit power is derived from a table in which the second power is associate with the first lower limit power; or
   the first lower limit power is derived from a function based on the generated power generated by the fuel cell.

4. The power supply system as claimed in claim 2, wherein the control device is configured to determine the first lower limit power,
   wherein the first lower limit power is derived from a map in which the generated power generated by the fuel cell is associated with time; or
   the first lower limit power is derived from a table in which the second power is associate with the first lower limit power; or
   the first lower limit power is derived from a function based on the generated power generated by the fuel cell.

5. The power supply system as claimed in claim 1, wherein the first lower limit power is further determined such that the lower a temperature of the fuel cell or near the fuel cell, the greater the increased difference.

6. The power supply system as claimed in claim 2, wherein the first lower limit power is further determined such that the lower a temperature of the fuel cell or near the fuel cell, the greater the increased difference.

7. The power supply system as claimed in claim 3, wherein the first lower limit power is further determined such that the lower a temperature of the fuel cell or near the fuel cell, the greater the increased difference.

8. The power supply system as claimed in claim 1, wherein the first lower limit is further determined such that the lower a humidity of the fuel cell or near the fuel cell, the greater the increased difference.

9. The power supply system as claimed in claim 2, wherein the first lower limit is further determined such that the lower a humidity of the fuel cell or near the fuel cell, the greater the increased difference.

10. The power supply system as claimed in claim 3, wherein the first lower limit is further determined such that the lower a humidity of the fuel cell or near the fuel cell, the greater the increased difference.

11. The power supply system as claimed in claim 5, wherein the first lower limit is further determined such that the lower a humidity of the fuel cell or near the fuel cell, the greater the increased difference.

12. A non-transitory computer readable medium, storing a program causing a control device which controls at least a fuel cell capable of generating power, in a case that power consumption of a load at least connected with the fuel cell and a power storage device storing power generated by the fuel cell decreases, to perform:
- a process of determining a first lower limit power based on generated power generated by the fuel cell before a predetermined time;
- a process of causing the fuel cell to generate a second power equal to or greater than the first lower limit power in a case where a first power generated by the fuel cell, which is determined based on a power supplied to the load, drops below the first lower limit power; and
- wherein the first lower limit power is determined such that the greater the generated power, the greater an increased difference between the generated power and the first lower limit power.

* * * * *